Oct. 17, 1944.  W. L. TOPOLSKI  2,360,597
MERCHANDISE WRAPPING
Filed Oct. 31, 1942
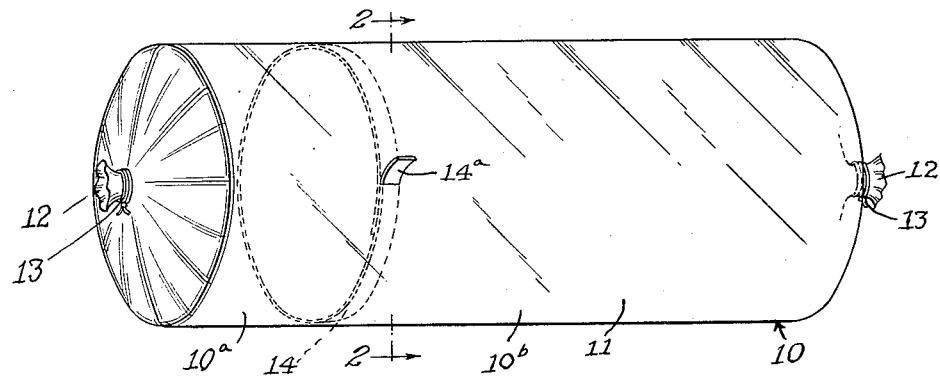
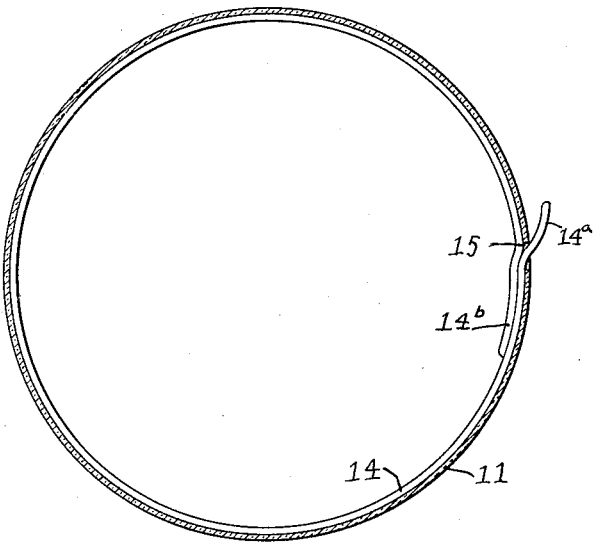
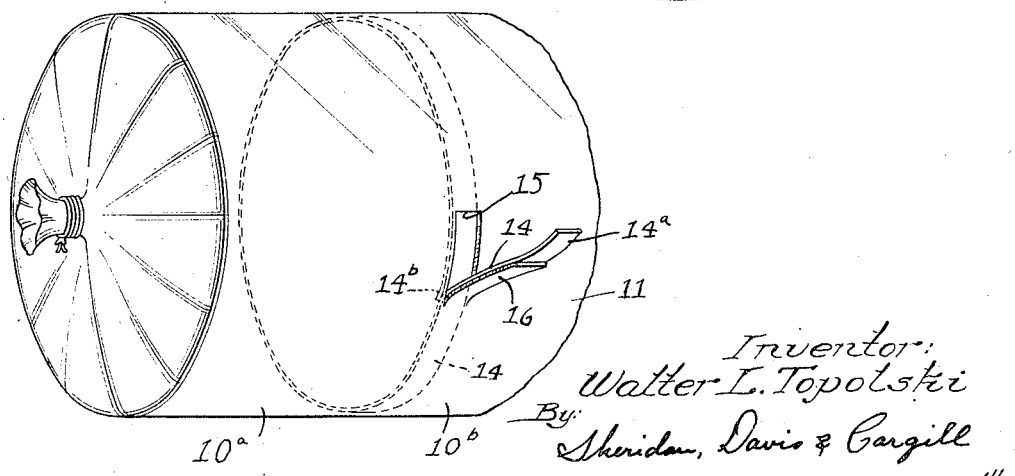
Inventor:
Walter L. Topolski
By: Sheridan, Davis & Cargill Patented Oct. 17, 1944

2,360,597

UNITED STATES PATENT OFFICE 2,360,597

MERCHANDISE WRAPPING

Walter L. Topolski, Chicago, Ill.

Application October 31, 1942, Serial No. 464,121

1 Claim. (Cl. 229—51)

This invention relates to improvements in merchandise wrapping.

In the packaging of certain products, particularly food products for the retail trade, such as meat products for example, it is desirable that the packaging or wrapping means not only afford hygienic protection to the products, but that the products be readily accessible by the retailer where sales are made in quantities less than the packaged unit. For example, some meat packers wrap boiled hams, and certain other meats or meat products in individual packages for distribution to retailers, such as butcher shops, delicatessen stores, etc., where the packages frequently must be opened for cutting or slicing off quantities for customers who wish to purchase less than the original contents of the packages. This is particularly true of those products, such as boiled hams, for example, which are relatively high in price. Such hams frequently are not of uniform quality from end to end since bone joints, gristle, or excess fat may be found at one end of such hams and if a butcher by mistake removes that end of the wrapper, he may then find it necessary to remove the other end of the wrapper also with the result that the balance of the wrapper may drop from the unsold portion of the ham, and the advantage of the wrapper is thus terminated.

In opening such wrappers a butcher or retail salesman frequently uses a knife to sever the end of the package and in so doing may cut off an end portion of the ham which is too thick for sale, but not thick enough to be sliced readily and thus goes into the scrap box.

An object of the present invention is to provide an improved packaging means or wrapper for meat or other products which affords hygienic protection to the products but which can be opened readily, without using a knife, to expose one end of the product to make it accessible for cutting or slicing without removal of the entire wrapper.

Another object of the invention is to provide a protective wrapper provided with a tear strip on the inside thereof and having one end accessible for use in severing the wrapper.

In the accompanying drawing illustrating an embodiment of the invention

Figure 1 is a perspective view of the improved wrapper;

Fig. 2 is a sectional view taken on line 2—2 of Fig. 1;

Fig. 3 is a broken perspective view illustrating the mode of opening the wrapper.

In the drawing 10 indicates a wrapper which preferably is of seamless, tubular shape formed of "Cellophane" or similar suitable material. The tubular shape of the wrapper may be provided by adhesively attaching together overlapped edge portions of a sheet, but for reasons mentioned later the seamless type of tubing is preferred.

The tubular material is cut in lengths greater than the length of the product to be wrapped whereby an individual wrapper such as member 10 of Fig. 1, can be closed over the ends of an article such as a ham or the like indicated at 11 in said figure to form a hermetically sealed package. In Fig. 1 the end portions of the wrapper 10 are shown as having been pressed inwardly and gathered in tufts 12 which are then tied with strings 13 to retain the ends in closed relation.

The means for opening the wrapper comprises a tape 14 which is adhesively attached to the inner wall of the wrapper in a plane extending transversely of the axis of the wrapper. An opening or slit 15 is provided in the wrapper through which one end of the tape 14 projects as at 14ª. The other end 14ᵇ of the tape extends over the opening 15 to close the same and is adhesively attached to the adjacent portion of the tape inside the wrapper as illustrated in Fig. 3. When a butcher or salesman wishes to open the wrapper the exterior end 14ª of the tape is grasped manually and drawn in a direction away from the inner end 14ᵇ or downwardly and around the package as suggested in Fig. 3.

The tape is formed of material of sufficient tensile strength to withstand the imposed stresses and tears the wrapper material along the edges of the tape, thus releasing the end portion 10ª of the wrapper from the larger portion 10ᵇ and enables the end portion 10ª to be removed from the article 11 by sliding it therefrom. The material of which the tape is formed is flexible but firm whereby the relatively sharp arrises of the tape lying next to the inner surface of the wrapper sever or shear the latter along the margins of the tape as the latter is operated as described above. The tape may be formed of suitable fibrous material or "Cellophane" or the like having sufficient thickness to give it the required strength and stiffness for shearing purposes is preferred. It is thus unnecessary to weaken the wrapper material by perforating or slitting the same circumferentially to enable the tape to sever the wrapper along the margins of the tape. When the outwardly projecting end of the tape is grasped and pulled as described the edges or arrises of the tape shear the wrapper progressively along the edges of the tape beginning at the opening 15. The operation of the tape as described removes a strip of wrapper material 16 from the wrapper, that is, the portion of the wrapper material to which the tape is adhesively attached.

The tape may be located nearer one end than the other, as illustrated in Fig. 1, so that upon initial opening of the wrapper and discarding the smaller or left hand portion, the major portion of the wrapper remains for protecting the unsold portion of the article or product from contamination by subsequent handling. Since the improved wrappers generally inclose the products somewhat loosely, the larger portions 10$^b$ of the wrappers may be slid rearwardly of the remaining portions of the contents as may be required in slicing off or removing subsequent portions from time to time. This is of advantage where meat products are packaged since the wrapper portions 10$^b$ continues to afford substantial protection to the contents so long as the section remains in use.

In utilizing the present improvements in packaging meat products such as hams which frequently have waste portions, or at least less desirable portions at one end as mentioned above, the top end section 10$^a$ of the wrapper which bears the tape 14 should be placed over the better end of the ham so that, upon opening the package the choicer portions of the meat will be accessible for slicing. The location of the tape, which may be colored to distinguish it from the wrapper, near one end may thus be employed by the packer to indicate the better portion of the contents and avoids the inconvenience that results from the inadvertent opening of present wrappers at the wrong ends.

While I have shown and described an embodiment of the invention for the purpose of illustration, changes may be made therein without departing from the scope and spirit of the invention.

I claim:

A wrapper for an article of merchandise comprising a seamless tubular casing of flexible material of a length sufficiently greater than the length of the article that the projecting end portions of the casing can be gathered and tied to close the casing ends for wholly inclosing the article, said casing having a slit therein, and a flexible tear-strip of firm material having substantial thickness transversely of the strip and being adhesively attached to the inner surface of the casing and extending therearound and having arrises adjacent said surface, one end of said strip projecting from said slit to the exterior of the wrapper for manual engagement in tearing the adhering portion of the casing from the adjacent portion thereof along said arrises of the strip for completely severing the casing circumferentially, said other end of said strip normally extending over and closing said slit.

WALTER L. TOPOLSKI.